United States Patent
Fan et al.

(10) Patent No.: US 7,620,241 B2
(45) Date of Patent: Nov. 17, 2009

(54) ARTIFACT REDUCTION IN A DIGITAL VIDEO

(75) Inventors: Jian Fan, San Jose, CA (US); D. Amnon Silverstein, Mountain View, CA (US); Qian Lin, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 718 days.

(21) Appl. No.: 10/999,739

(22) Filed: Nov. 30, 2004

(65) Prior Publication Data

US 2006/0115178 A1  Jun. 1, 2006

(51) Int. Cl.
    *G06K 9/36* (2006.01)
(52) U.S. Cl. ............... 382/167; 382/232; 382/236; 348/246
(58) Field of Classification Search ............ 382/201; 348/246
    See application file for complete search history.

(56) References Cited

U.S. PATENT DOCUMENTS

| | | | |
|---|---|---|---|
| 5,063,603 A | 11/1991 | Burt | |
| 5,436,979 A | 7/1995 | Gray et al. | |
| 5,519,790 A * | 5/1996 | Manning | 382/236 |
| 5,574,800 A * | 11/1996 | Inoue et al. | 382/149 |
| 5,694,487 A * | 12/1997 | Lee | 382/201 |
| 6,035,072 A | 3/2000 | Read | |
| 6,125,213 A | 9/2000 | Morimoto | |
| 6,229,578 B1 * | 5/2001 | Acharya et al. | 348/607 |
| 6,233,364 B1 | 5/2001 | Krainiouk et al. | |
| 6,266,054 B1 | 7/2001 | Lawton et al. | |
| 6,335,985 B1 * | 1/2002 | Sambonsugi et al. | 382/190 |
| 6,353,632 B1 * | 3/2002 | Moeller et al. | 375/240.01 |
| 6,415,053 B1 * | 7/2002 | Norimatsu | 382/199 |
| 6,442,203 B1 * | 8/2002 | Demos | 375/240.16 |
| 6,578,017 B1 | 6/2003 | Ebersole et al. | |
| 6,590,934 B1 * | 7/2003 | Kim | 375/240 |
| 6,792,161 B1 | 9/2004 | Imaizumi et al. | |
| 6,794,608 B2 | 9/2004 | Flood et al. | |
| 6,850,249 B1 * | 2/2005 | Gu | 345/623 |
| 7,012,642 B1 * | 3/2006 | Zell | 348/246 |
| 7,283,164 B2 * | 10/2007 | Kakarala et al. | 348/246 |
| 7,375,763 B2 * | 5/2008 | Alfonso et al. | 348/448 |
| 7,447,781 B2 * | 11/2008 | Chan et al. | 709/228 |
| 7,477,781 B1 * | 1/2009 | Tanbakuchi | 382/167 |

(Continued)

FOREIGN PATENT DOCUMENTS

EP    1289310 A2 * 3/2003

(Continued)

OTHER PUBLICATIONS

Selective Block matching and error concealment in video systems, Chun et al., IEEE, 2002, 0007664619, (Abstract only).*

(Continued)

*Primary Examiner*—Brian P Werner
*Assistant Examiner*—Jayesh Patel (57) ABSTRACT

A method performed by a processing system is provided. The method comprises detecting an artifact in a first frame of a digital video using a plurality of edges identified in the first frame and replacing a region that encompasses the artifact in the first frame with a corresponding region from a second frame.

28 Claims, 4 Drawing Sheets

U.S. PATENT DOCUMENTS

| | | | |
|---|---|---|---|
| 7,505,080 B2 * | 3/2009 | Leaback | 348/452 |
| 2002/0071613 A1 | 6/2002 | Ford et al. | |
| 2004/0070676 A1 * | 4/2004 | Lawther et al. | 348/222.1 |

FOREIGN PATENT DOCUMENTS

| | | | |
|---|---|---|---|
| GB | 2356514 | * | 5/2001 |
| JP | 2000354176 A | * | 12/2000 |
| JP | 2003023572 | * | 1/2003 |

OTHER PUBLICATIONS

Color image enhancement by forward and backward—flow,0006911823, Sep. 2000, Sochen et al. (Abstract only).*

Schallauer P et al—"Automatic Restoration Algorithms for 35MM Film"—Journal of Computer Vision Research vol. 1 No. 3—1999 pp. 60-85.

Joyeux L et al—"Reconstruction of Degraded Image Sequence. Application to Film Restoration"—Image and Vision Computing—vol. 19 2001—pp. 503-516.

Sonka M et al—"Passage"—Image Processing, Analysis and Machine Vision—1999 pp. 134-135 & 174-175.

HS Digital Service—"Noise/Grain Reduction—Scratch/Dust Removal"—Jun. 7, 2004 pp. 1-2.

Kuiper A—"Detection of Dirt Blotches on Optical Sound Tracks Using Digital Image Processing" RadioElectronkia 2005—pp. 120-123.

* cited by examiner

ARTIFACT REDUCTION IN A DIGITAL VIDEO

BACKGROUND

Movies, videos, and other images may be captured from one or more scenes using a video medium such as film and a video capture device such as a camera. After processing, the video medium may be used to reproduce the images by displaying the images using a display device such as a projector. Occasionally, artifacts caused by dust and scratches, for example, may appear on the video medium. The artifacts may affect the display of the images of the video medium in undesired ways.

For example, a video medium such as TechniColor film captured with a TechniColor camera may have artifacts in the form of dust or scratches on the surface of one or more of the color planes of the film. With the TechniColor camera, the images are captured using a separate filmstrip for the red, green, and blue colors to generate red, green, and blue planes for each image. As a result, dust or scratches on any one of the red, green or blue filmstrips may be displayed when an image is projected onto a screen or other display device.

Artifacts on a video medium may also appear in a digitized version of the video medium. In converting a video medium to a digital form, artifacts may also be converted and become part of a digital video. Consequently, the artifacts may appear when the digital video is viewed or displayed. It would be desirable to be able to improve the display of a digital video with artifacts.

SUMMARY

One form of the present invention provides a method performed by a processing system. The method comprises detecting an artifact in a first frame of a digital video using a plurality of edges identified in the first frame and replacing a region that encompasses the artifact in the first frame with a corresponding region from a second frame.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

As described herein, a system, method, and program product for generating an enhanced digital video is provided. For each frame in the digital video, the system, method, and program product contemplate detecting and removing artifacts caused by dust and scratches, for example, to generate an enhanced digital video. An artifact in a frame is detected using a gradient calculated from pixel values in the frame. Once detected, a block that includes the artifact is replaced with a block from a previous or next frame. As a result, visual appearance of a digital video may be enhanced.

Figure 1:
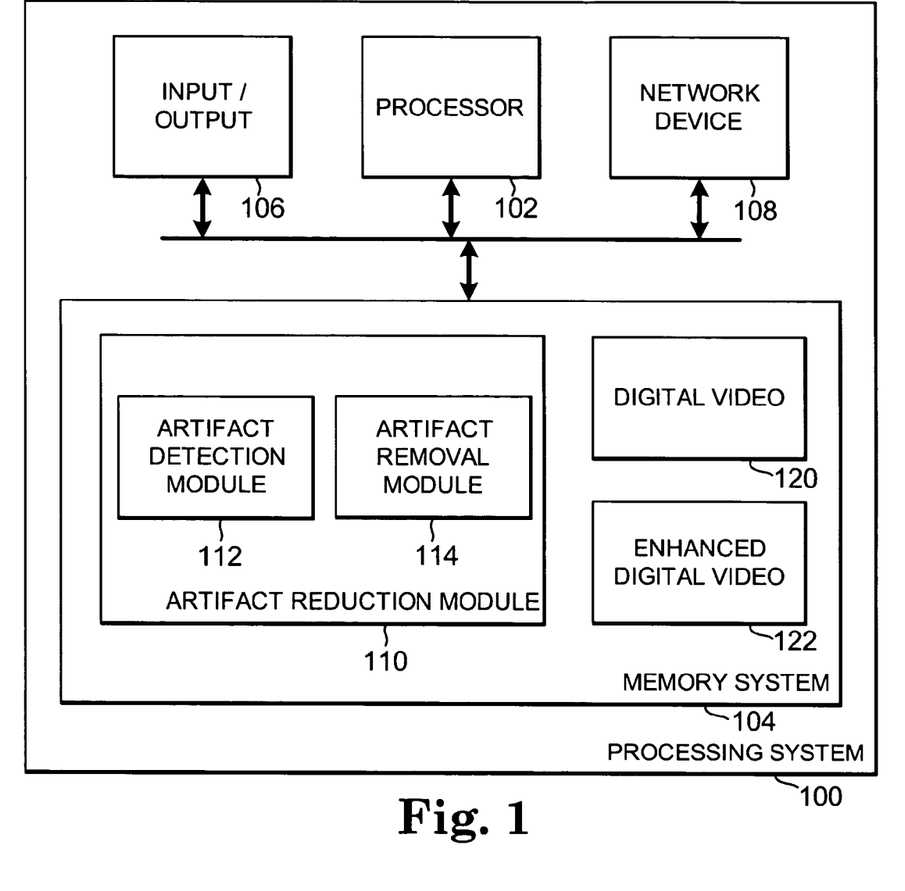
FIG. 1 is a block diagram illustrating a processing system configured to remove artifacts from a digital video according to one embodiment of the present invention.

FIG. 1 is a block diagram illustrating a processing system 100 configured to remove artifacts from a digital video 120. Processing system 100 comprises a processor 102, a memory system 104, an input/output unit 106, and a network device 108. Memory system 104 comprises an artifact reduction module 110, an artifact detection module 112, an artifact removal module 114, digital video 120, and an enhanced digital video 122.

Processing system 100 is configured to generate enhanced digital video 122 from digital video 120 using artifact reduction module 110, artifact detection module 112, and artifact removal module 114. Processing system 100 comprises any type of computer system or portable or non-portable electronic device. Examples computer systems include desktop, laptop, notebook, workstation, or server computer systems, and examples of electronic devices include digital cameras, digital video cameras, printers, scanners, mobile telephones, and personal digital assistants.

In one embodiment, artifact reduction module 110, artifact detection module 112, and artifact removal module 114 each comprise instructions stored in memory system 104 that are accessible and executable by processor 102. Memory system 104 comprises any number and types of volatile and non-volatile storage devices such as RAM, hard disk drives, CD-ROM drives, and DVD drives. In other embodiments, artifact reduction module 110, artifact detection module 112, and artifact removal module 114 may comprise any combination of hardware and software components configured to perform the functions described herein.

A user of processing system 100 manages and controls the operation of artifact reduction module 110, artifact detection module 112, and artifact removal module 114 by providing inputs and receiving outputs using input/output unit 106. Input/output unit 106 may comprise any combination of a keyboard, a mouse, a display device, or other input/output device that is coupled, directly or indirectly, to processing system 100.

Artifact reduction module 110, artifact detection module 112, artifact removal module 114, and digital video 120 may each be stored on a medium separate from processing system 100 (not shown) prior to being stored in processing system 100. Examples of such a medium include a hard disk drive, a compact disc (e.g., a CD-ROM, CD-R, or CD-RW), and a digital video disc (e.g., a DVD, DVD-R, or DVD-RW). Processing system 100 may access artifact reduction module 110, artifact detection module 112, artifact removal module 114, and digital video 120 from a remote processing or storage system (not shown) that comprises the medium using network device 108. Network device 108 may be coupled, directly or indirectly, to any type of wired or wireless local area, wide area, or global communications network.

Digital video 120 comprises a plurality of digital frames. Each frame may be displayed separately to form an image or in succession, e.g., 24 or 30 frames per second, to form a video (i.e., a set of images that may appear to be moving). Digital video 120 may comprise one or more scenes where a scene comprises a set of related frames. In one embodiment, digital video 120 comprises an RGB color space where each frame has a red plane with red pixel values, a blue plane with blue pixel values, and a green plane with green pixel values. The red, green, and blue pixel values are combined during the display of digital video 120 to reproduce the images of digital video 120. In other embodiments, each frame may comprise other sets of color planes or may combine the pixel values for each color.

Digital video 120 may be generated either from a video or other set of images from another medium, e.g., film, or from a camera or other image capture device directly. For example, a TechniColor film captured using a TechniColor camera may be converted into digital video 120 using a scanning process. In other embodiments, digital video 120 may comprise a single image frame or an unrelated set of image frames.

Figure 2:
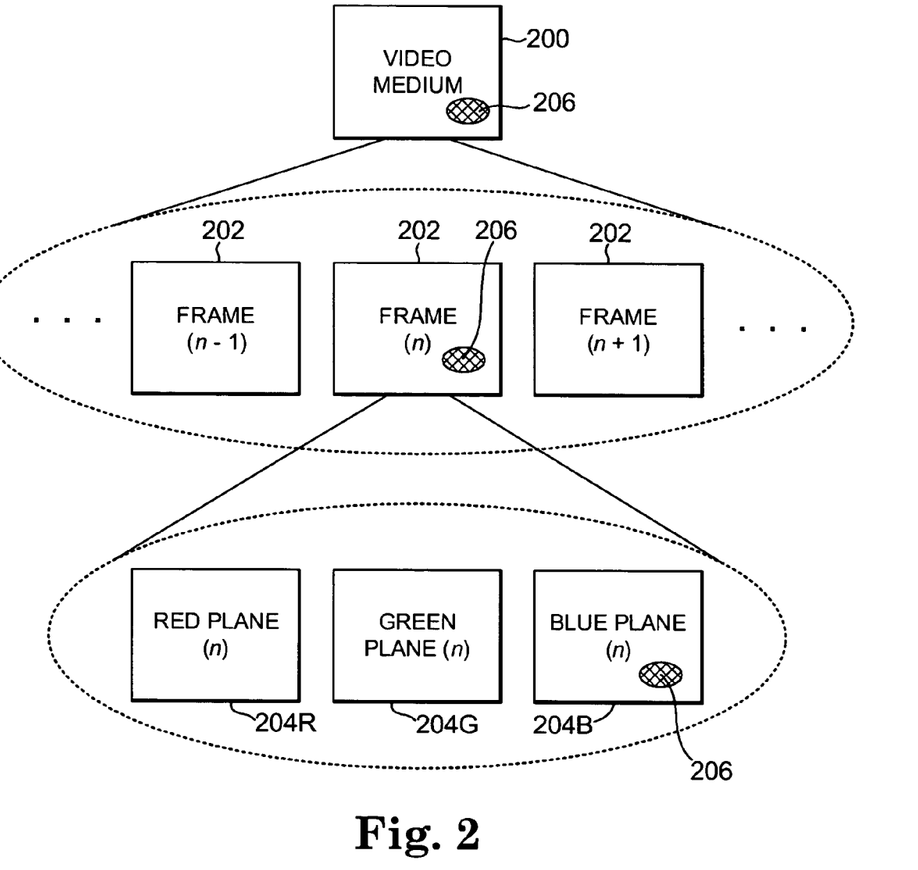
FIG. 2 is a block diagram illustrating a video medium with an artifact according to one embodiment of the present invention.

FIG. 2 is a block diagram illustrating a video medium 200 with an artifact 206 from which digital video 120 is generated. Video medium 200 comprises a sequential series of frames 202 where each frame has a red plane 204R, a green plane 204G, and a blue plane 204B, i.e., color planes 204. In one embodiment, video medium 200 comprises TechniColor film. In other embodiments, video medium 200 comprises other types of film or media.

In the example shown in FIG. 2, frame (n) 202 and blue plane (n) 204B each comprise artifact 206 where n is an integer that designates a frame in the sequence. Artifact 206 may be any type of aberration in video medium 200, such as an aberration caused by dust or a scratch, which causes an undesired form, shape, or color to appear in the display of one or more images of video medium 200. Video medium 200 may comprise any number of artifacts 206 such that each frame 202 and each color plane 204 may have zero or more artifacts 206.

Figure 3:
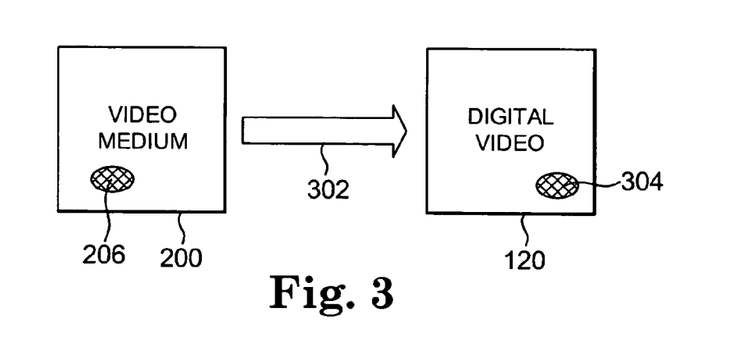
FIG. 3 is a block diagram illustrating a process of generating a digital video from a video medium with an artifact according to one embodiment of the present invention.

FIG. 3 is a block diagram illustrating a process of generating digital video 120 from video medium 200 as indicated by an arrow 302. In the process of converting video medium 200 to digital video 120, artifact 206 as well as any other artifacts (not shown) is reproduced in one or more of the frames or color planes of digital video 120 as artifact 304.

Referring back to FIG. 1, processing system 100 executes artifact reduction module 110, artifact detection module 112, and artifact removal module 114 to generate enhanced digital video 122 from digital video 120. In doing so, artifact detection module 112 and artifact removal module 114 attempt to removal artifact 304 and any other artifacts (not shown) from digital video 120 to generate enhanced digital video 122.

Figure 4:
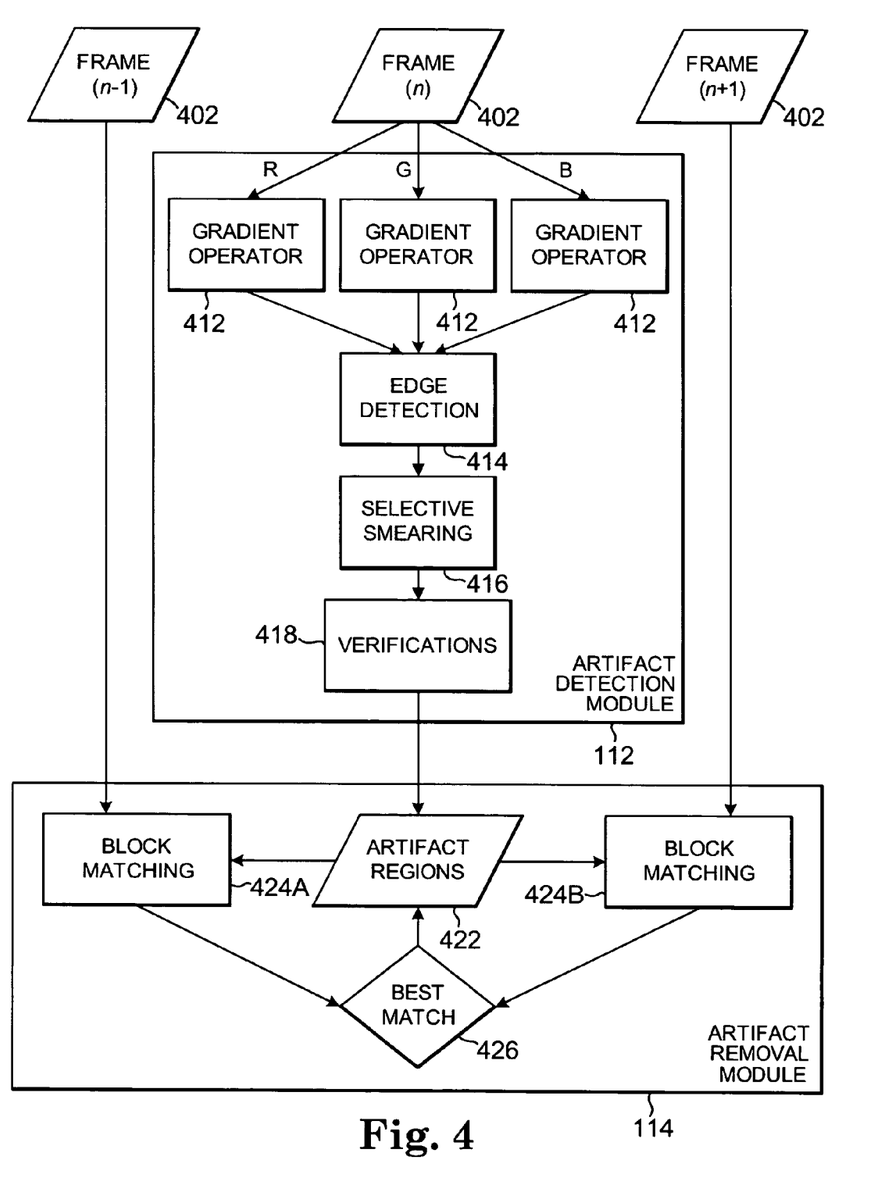
FIG. 4 is a block diagram illustrating a process for detecting and removing artifacts from a digital video according to one embodiment of the present invention.

FIG. 4 is a block diagram illustrating a process for detecting and removing artifacts from frame (n) 402 in digital video 120 to generate enhanced digital video 122 where n is an integer that designates a frame 402 in a sequential series of frames 402.

In the embodiment of FIG. 4, artifact detection module 112 comprises a gradient operator 412 for each color plane of digital video 120, an edge detection unit 414, a selective smearing unit 416, and a verifications unit 418. In the embodiment shown in FIG. 4, digital video 120 comprises red (R), green (G), and blue (B) color planes as indicated from the arrows between frame (n) 402 and gradient detection units 412. In other embodiments, digital video 120 may comprise other types or numbers of color planes. In response to being executed by processing system 100, artifact detection module 112 detects artifact regions that comprise one or more artifacts and provides information that identifies the artifact regions, i.e., artifact regions 422, to artifact removal module 114. Artifact removal module 114 comprises block matching units 424A and 424B, and a best match unit 426.

Figure 5:
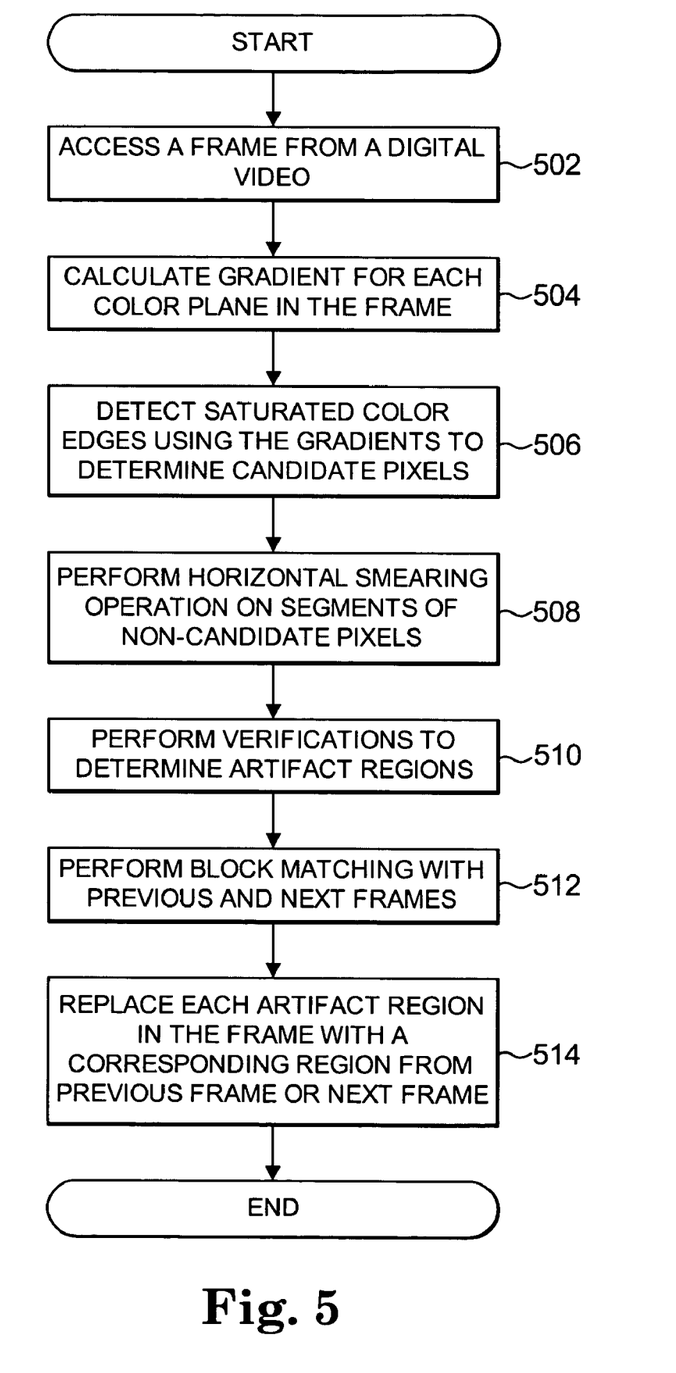
FIG. 5 is a flow chart illustrating a method for detecting and removing artifacts from a digital video according to one embodiment of the present invention.

The operation of artifact detection module 112 and artifact removal module 114 will now be described with reference to FIG. 5. FIG. 5 is a flow chart illustrating a method for detecting and removing artifacts from frame (n) 402 in digital video 120 to generate enhanced digital video 122. The method may be performed by processing system 100 using artifact detection module 112 and artifact removal module 114 for each frame 402 of digital video 120.

Referring to FIGS. 4 and 5, processing system 100 executes artifact detection module 112 to access frame (n) 402 from digital video 120 as indicated in a block 502. Processing system 100 executes gradient operator 412 to calculate a gradient for each color plane in frame (n) 402 as indicated in a block 504. In one embodiment, gradient operator 412 calculates the gradient for each color plane using 3×3 Sobel Operators. For example, the gradient of the red color plane (r) is computed using Equations I, II, and III as follows.

$$p_{i,j}{}^r = 0.25 \cdot [(r_{i+1,j-1} + 2r_{i+1,j} + r_{i+1,j+1}) - (r_{i-1,j-1} + 2r_{i-1,j} + r_{i-1,j+1})] \quad \text{Equation I}$$

$$q_{i,j}{}^r = 0.25 \cdot [(r_{i+1,j+1} + 2r_{i,j+1} + r_{i-1,j+1}) - (r_{i+1,j-1} + 2r_{i,j-1} + r_{i-1,j-1})] \quad \text{Equation II}$$

$$g_{i,j}{}^r = \sqrt{(p_{i,j}{}^r)^2 + (q_{i,j}{}^r)^2} \quad \text{Equation III}$$

where r(i, j) represents a pixel value in the red plane, and $p_{i,j}$ and $q_{i,j}$ are variables calculated in Equations I and II, respectively, and used to calculate the gradient in Equation III. Gradient operator 412 calculates gradients for the green plane (g) and the blue plane (b) similarly. In other embodiments, gradient operator 412 causes the gradient for each color plane to be calculated using other operators.

Processing system 100 executes edge detection unit 414 to compare the gradient for each color plane to detect saturated color edges using the gradients as indicated in a block 506. By doing so, processing system 100 determines candidate pixels. Edge detection unit 414 identifies edge locations by searching for the largest gradient among $(g_{i,j}{}^r, g_{i,j}{}^g, g_{i,j}{}^b)$ that satisfy the condition $g_{i,j}{}^{c0} > th$ AND $g_{i,j}{}^{c1} < (k_1 \cdot g_{i,j}{}^{c0})$ AND $g_{i,j}{}^{c2} < (k_1 \cdot g_{i,j}{}^{c0})$, where $c_0$, $c_1$, $c_2$ specify an arbitrary order of r, g and b, and th is a threshold proportional to the range of pixel values in the red, green, and blue planes. For example, $th = k_0 \cdot 65535$ for an image of 16-bit data precision. The variables $k_0$ and $k_1$ are real numbers in the range of (0,1]. The lower the $k_1$, the tighter the constraint. In one embodiment, $k_0 = 0.05$ and $k_1 = 0.5$. In other embodiments, $k_0$ and $k_1$ comprise other values. If one of the gradients $(g_{i,j}{}^r, g_{i,j}{}^g, g_{i,j}{}^b)$ meets the criteria, the pixel associated with the gradient is flagged as a candidate pixel of color type $c_0$.

In another embodiment, edge detection unit 414 compares gradient magnitudes in the gradient of each color plane with a threshold for that color plane. Edge detection unit 414 leaves gradient magnitudes above the threshold unchanged and sets gradient magnitudes at or below the threshold to zero. The unchanged, i.e., non-zero, gradient magnitudes in each color plane comprise the candidate pixels. Edge detection unit 414 calculates a threshold for a color plane by computing the average gradient magnitude in various regions of the gradient for that color and finding the maximum of these average gradient magnitudes. Edge detection unit 414 sets the threshold for the color to be proportional to the maximum average gradient magnitude up to a maximum threshold value. Edge detection unit 414 calculates a threshold for each color plane separately.

In other embodiments, edge detection unit 414 detects saturated color edges in other ways, i.e., without using gradients calculated by gradient operators 412. In these embodiments, gradient operators 412 are replaced with other units configured to generate information used by edge detection unit 414 to detect saturated color edges.

Processing system 100 executes selective smearing unit 416 to perform a horizontal smearing operation on segments of non-candidate pixels for each color as indicated in a block 508. The horizontal smearing operation allows processing system 100 to better identify candidate artifacts. Artifacts caused by dust and scratches generally constitute a closed boundary that is defined by the candidate pixels generated by edge detection unit 414. For large artifacts caused by dust and scratches, only boundary pixels of the artifact, rather than interior pixels, may be detected as saturated color edges because artifacts caused by dust and scratches generally produce low gradient magnitudes in the interior of the artifact.

Selective smearing unit 416 performs the horizontal smearing operation on segments of non-candidate pixels in a row in response to determining that three conditions are met. The first condition is that the segment length (in pixel count) does not exceed a maximum length associated with an assumed maximum size of dust and/or scratch artifacts, e.g., 40 pixels. The second condition is that the two candidate pixels that delimit the segment are of the same color type. The third condition is that neighboring pixels in the previous row of the same location also comprise candidate pixels, e.g., the number $N_p$ of pixels in the previous row classified as candidate pixels of the same color type exceeds a high percentage such that $N_p > (j_1 - j_0 + 1 - s)$ where $j_1 - j_0$ is equal to the segment length in the current row and $s=3$ according to one embodiment.

If all three conditions are met, selective smearing unit 416 sets the non-candidate pixels as candidate pixels of the same color type as the two delimiting candidate pixels. By doing so, selective smearing unit 416 associates the interior of a candidate artifact with its boundaries. In other embodiments, selective smearing unit 416 performs the smearing operation in other directions, e.g., vertically in a column or diagonally, and in response to other conditions associated with the set of candidate pixels.

Processing system 100 executes verifications unit 418 to perform verifications for each candidate artifact to determine artifact regions as indicated in a block 510. The verifications include comparing the edges of candidate artifacts to corresponding locations in other color planes and comparing the average color of the candidate artifact with the average color of a region around the candidate artifact.

In one embodiment, verifications unit 418 performs a one dimensional (horizontal or vertical) verification method as follows. Verification unit 418 scans each candidate interval (i.e., a series of continuous candidate pixels in a row or column) in the raster order. For each interval, verifications unit 418 finds the two colors of the two delimit external pixels $(r_0, g_0, b_0)$ and $(r_1, g_1, b_1)$. For each candidate pixel in the interval of color type x and pixel attribute (r, g, b), verifications unit 418 computes the scaled differences: $\Delta r_0 = (r-r_0)/r_0$, $\Delta g_0 = (g-g_0)/g_0$, $\Delta b_0 = (b-b_0)/b_0$, $\Delta r_1 = (r-r_1)/r_1$, $\Delta g_1 (g-g_1)/g_1$, and $\Delta b_1 = (b-b_1)/b_1$, and verifies the following conditions:

1) $(|\Delta x_0| > tH$ AND $|\Delta x_1| > tH$ AND $sgn(\Delta x_0) = sgn(\Delta x_1))$; and 2) $\begin{pmatrix} |\Delta y_0| < (k_v \cdot |\Delta x_0|) \text{ AND } |\Delta z_0| < (k_v \cdot |\Delta x_0|) \text{ AND } |\Delta y_1| < (k_v \cdot |\Delta x_1|) \\ \text{AND } |\Delta z_1| < (k_v \cdot |\Delta x_1|) \end{pmatrix}$, where x is the color type of the candidate pixel, (y, z) is the other two color attributes of the pixel, tH is a threshold value, and $k_v$ is a constant value. If any one of the conditions is not met, verifications unit 418 reclassifies the pixel as a non-candidate pixel. Verifications unit 418 may perform a horizontal followed by vertical verification as just described.

In embodiments where each color plane is separate from the other color planes, e.g., TechniColor film, artifacts cause by dust and scratches typically appear in only one of the color planes. Accordingly, verifications unit 418 performs an 8-neighbor connectivity to determine whether a candidate artifact has corresponding edges in at least one other color plane. If so, then the candidate artifact is most likely a desired part of the image and is eliminated as a candidate artifact by verifications unit 418.

Figure 6:
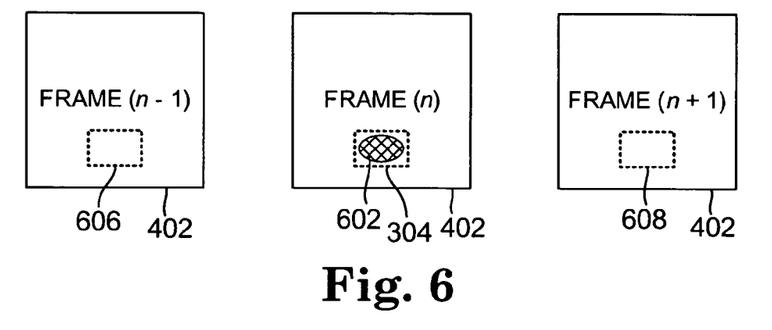
FIG. 6 is a block diagram illustrating a process for replacing a region with an artifact in a frame of a digital video according to one embodiment of the present invention.

If not, then verifications unit 418 compares the average color of pixels of the candidate artifact with the average color of pixels in a region around the candidate artifact in the same color plane as the candidate artifact. As shown in FIG. 6, the region may comprise a rectangular region 602 that encompasses the candidate artifact 304. In other embodiments, region 602 comprises other shapes and sizes to encompass candidate artifact 304. If the average color of pixels of candidate artifact 304 does not differ significantly from the average color of pixels in the region around candidate artifact 304, then candidate artifact 304 is most likely a desired part of the image and is eliminated as a candidate artifact by verifications unit 418. In one embodiment, verifications unit 418 determines that the average color of pixels of the candidate artifact differs significantly from the average color of pixels in the region around the candidate artifact if the average color of pixels of the candidate artifact is either greater than the maximum of the pixels values in the region around the candidate artifact or is less than the minimum of the pixels values in the region around the candidate artifact.

If the edges of a candidate artifact do not correspond to edge locations in other color planes and if the average color of the candidate artifact differs significantly from the average color of an region around the candidate artifact, then verifications unit 418 determines that the candidate artifact is most likely an artifact caused by dust or scratches, for example, and stores information that identifies the region that encompasses the artifact region, e.g., region 602.

After one or more artifacts are detected as just described, processing system 100 executes artifact removal module 114 to perform block matching with a previous frame (n−1) 402 and a next frame (n+1) 402 as indicated in a block 512. Artifact removal module 114 creates a binary mask of frame (n) 402 to indicate locations of artifact regions. Artifact removal module 114 searches previous frame (n−1) 402 using block matching unit 424A and next frame (n+1) 402 using block matching unit 424B. Block matching units 424A and 424B use motion compensation techniques, if necessary, to find the closest match in previous frame (n−1) 402 and next frame (n+1) 402, respectively, with frame (n) 402 excluding the artifact region or regions.

Processing system 100 executes artifact removal module 114 to replace each artifact region in frame (n) 402 with a corresponding block from either previous frame (n−1) 402 or next frame (n+1) 402 as indicated in a block 514. FIG. 6 is a block diagram illustrating a process for replacing artifact region 602 that includes artifact 304 in frame (n) 402 of digital video 120. If previous frame (n−1) 402 is the closest match with frame (n) 402, then best match unit 426 replaces artifact region 602 in frame (n) 402 with a region 606 from previous frame (n−1) 402. If next frame (n+1) 402 is the closest match with frame (n) 402, then best match unit 426 replaces artifact region 602 in frame (n) 402 with a region 608 from next frame (n+1) 402. Other artifact regions (not shown) are similarly replaced.

Using the system and method described above, artifacts in a digital video, such as those that appear in a video medium from which the digital video is derived, may be removed. Accordingly, the display of the digital video may be enhanced.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a processing system, the method comprising:
    separately calculating first and second gradients for first and second color planes, respectively, of a first frame of a digital video with the processing system;
    comparing the first gradient to the second gradient to identify a set of candidate pixels of an artifact in the first color plane of the first frame with the processing system;
    comparing pixel values of the first color plane that correspond to the set of candidate pixels to corresponding pixel values of the second color plane to verify that the set of candidate pixels form the artifact in the first color plane of the first frame with the processing system; and
    replacing a region that encompasses the artifact in the first color plane of the first frame with a corresponding region from the first color plane of a second frame with the processing system.

2. The method of claim 1 further comprising:
    detecting a plurality of edges in the first color plane of the first frame using the first gradient, wherein the set of candidate pixels correspond to the plurality of edges with the processing system.

3. The method of claim 1 further comprising:
    comparing a plurality of gradient magnitudes of the first gradient to a threshold to identify the set of candidate pixels with the processing system.

4. The method of claim 3 further comprising:
    setting each one of the plurality of gradient magnitudes that is less than or equal to the threshold to zero with the processing system.

5. The method of claim 1 further comprising:
    determining that an average color of pixels that comprise the artifact differs significantly from an average color of pixels that comprise the region that encompasses the artifact in the first color plane of the first frame outside of the artifact to verify that the set of candidate pixels form the artifact prior to replacing the region that encompasses the artifact in the first frame with the corresponding region from the second frame with the processing system.

6. The method of claim 1 wherein the second frame comprises a previous frame from the first frame.

7. The method of claim 1 wherein the second frame comprises a next frame from the first frame.

8. The method of claim 1 further comprising:
    performing block matching between the first color plane of the second frame and the first color plane of the first frame with the processing system.

9. The method of claim 8 further comprising:
    performing block matching between the first color plane of a third frame and the first color plane of the first frame with the processing system.

10. The method of claim 9 wherein second frame comprises a previous frame with respect to the first frame, and wherein the third frame comprises a next frame with respect to the first frame.

11. The method of claim 9 wherein second frame comprises a next frame with respect to the first frame, and wherein the third frame comprises a previous frame with respect to the first frame.

12. A system comprising:
    a processor; and
    a memory system for storing a digital video and an artifact reduction module;
    wherein the processor is configured to execute the artifact reduction module to:
        separately calculate first and second gradients for first and second color planes, respectively, of a first frame of a digital video;
        compare the first gradient to the second gradient to identify a set of candidate pixels of an artifact in the first color plane of the first frame;
    compare pixel values of the first color plane that correspond to the set of candidate pixels to corresponding pixel values of the second color plane to verify that the set of candidate pixels form the artifact in the first color plane of the first frame; and replace a region that encompasses the artifact in the first color plane of the first frame with a corresponding region from the first color plane of a second frame.

13. The system of claim 12 wherein the region and the corresponding region each comprise a rectangular region.

14. The system of claim 12 wherein the processor is configured to execute the artifact reduction module to:
    detect a plurality of edges in the first color plane of the first frame using the first gradient, wherein the set of candidate pixels correspond to the plurality of edges.

15. The system of claim 14 wherein the processor is configured to execute the artifact reduction module to:
    include a plurality of gradient magnitudes in the first gradient that is between at least two of the set of candidate pixels in the set of candidate pixels.

16. The system of claim 12 wherein the processor is configured to execute the artifact reduction module to:
    compare a plurality of gradient magnitudes of the first gradient to a threshold to identify the set of candidate pixels.

17. The system of claim 16 wherein the processor is configured to execute the artifact reduction module to:
    set each one of the plurality of gradient magnitudes that is less than or equal to the threshold to zero.

18. The system of claim 12 wherein the first frame comprises the first color plane, and wherein the processor is configured to execute the artifact reduction module to:
    determine that an average color of pixels that comprise the artifact differs significantly from an average color of pixels that comprise the region that encompasses the artifact in the first color plane of the first frame outside of the artifact to verify that the set of candidate pixels form the artifact prior to replacing the region that encompasses the artifact in the first frame with the corresponding region from the second frame.

19. The system of claim 12 wherein the processor is configured to execute the artifact reduction module to:
perform block matching between the first color plane of the second frame and the first color plane of the first frame.

20. The system of claim 12 wherein the processor is configured to execute the artifact reduction module to:
perform block matching between the first color plane of a third frame and the first color plane of the first frame.

21. A system comprising:
means for separately calculating first and second gradients for first and second color planes, respectively, of a first frame of a digital video;
means for comparing the first gradient to the second gradient to identify a set of candidate pixels of an artifact in the first color plane of the first frame;
means for comparing pixel values of the first color plane that correspond to the set of candidate pixels to corresponding pixel values of the second color plane to verify that the set of candidate pixels form the artifact in the first color plane of the first frame; and
means for replacing a region that encompasses the artifact in first color plane of the the first frame with a corresponding region from the first color plane of a second frame.

22. A computer-readable medium encoded with computer-readable instructions for causing the computer to generate enhanced video comprising:
separately calculating first and second gradients for first and second color planes, respectively, of a first frame of a digital video;
comparing the first gradient to the second gradient to identify a set of candidate pixels of an artifact in the first color plane of the first frame;
comparing pixel values of the first color plane that correspond to the set of candidate pixels to corresponding pixel values of the second color plane to verify that the set of candidate pixels form the artifact in the first color plane of the first frame; and
replacing a region that encompasses the artifact in first color plane of the the first frame with a corresponding region from the first color plane of a second frame.

23. The computer-readable medium of claim 22 wherein the computer-readable medium includes instructions executable by the computer for:
detecting a plurality of edges in the first color plane of the first frame using the first gradient, wherein the set of candidate pixels correspond to the plurality of edges.

24. The computer-readable medium of claim 22 wherein the computer-readable medium includes instructions executable by the computer for:
determining that an average color of pixels that comprise the artifact differs significantly from an average color of pixels that comprise the region that encompasses the artifact in the first color plane of the first frame outside of the artifact to verify that the set of candidate pixels form the artifact prior to replacing the region that encompasses the artifact in the first frame with the corresponding region from the second frame.

25. The computer-readable medium of claim 22 wherein the computer-readable medium includes instructions executable by the computer for:
performing block matching between the first color plane of the second frame and the first color plane of the first frame; and
performing block matching between the first color plane of a third frame and the first color plane of the first frame.

26. The method of claim 1 further comprising:
generating the first color plane of the first frame from a first color filmstrip with the processing system; and
generating the second color plane of the first frame from a second color filmstrip with the processing system.

27. The system of claim 12 wherein the first color plane of the first frame is generated from a first color filmstrip, and wherein the second color plane of the first frame is generated from a second color filmstrip.

28. The system of claim 12 wherein the first color plane of the first frame is generated from a first color filmstrip, and wherein the second color plane of the first frame is generated from a second color filmstrip.

* * * * *

UNITED STATES PATENT AND TRADEMARK OFFICE
CERTIFICATE OF CORRECTION

| | | |
|---|---|---|
| PATENT NO. | : 7,620,241 B2 | Page 1 of 1 |
| APPLICATION NO. | : 10/999739 | |
| DATED | : November 17, 2009 | |
| INVENTOR(S) | : Jian Fan et al. | |

It is certified that error appears in the above-identified patent and that said Letters Patent is hereby corrected as shown below:

In column 9, line 27, in Claim 21, delete "the the" and insert -- the --, therefor.

In column 10, line 2, in Claim 22, delete "the the" and insert -- the --, therefor.

Signed and Sealed this

Sixteenth Day of March, 2010

David J. Kappos
*Director of the United States Patent and Trademark Office*